(12) United States Patent
Wayton, Jr. et al.

(10) Patent No.: US 6,217,457 B1
(45) Date of Patent: Apr. 17, 2001

(54) AXIALLY ADJUSTABLE STEERING SHAFT ASSEMBLY WITH RODS AND LINEAR BEARINGS

(75) Inventors: William J. Wayton, Jr., Toledo; Daniel E. Beitzel, Perrysburg, both of OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/578,380

(22) Filed: May 25, 2000

(51) Int. Cl.[7] ........................................................ F16C 3/03
(52) U.S. Cl. ........................ 464/168; 464/167; 464/165; 74/493
(58) Field of Search ...................... 464/165, 167, 464/168; 280/263; 74/492, 493

(56) References Cited

U.S. PATENT DOCUMENTS

| | | |
|---|---|---|
| 3,136,142 | 6/1964 | Zeidler . |
| 3,304,745 | 2/1967 | King et al. . |
| 3,356,424 | 12/1967 | Edwards . |
| 3,360,308 | 12/1967 | Grabowski et al. . |
| 3,552,806 | 1/1971 | Weasler et al. . |
| 4,133,190 * | 1/1979 | Schuller ................................ 464/168 |
| 4,166,400 * | 9/1979 | Manning et al. ...................... 74/493 |
| 4,384,861 | 5/1983 | Lange et al. . |
| 4,774,851 | 10/1988 | Iwanami et al. . |
| 5,520,416 | 5/1996 | Singer, III et al. . |
| 5,737,971 | 4/1998 | Riefe et al. . |
| 5,911,789 | 6/1999 | Keipert et al. . |

* cited by examiner

Primary Examiner—Lynne H. Browne
Assistant Examiner—Aaron M Dunwoody
(74) Attorney, Agent, or Firm—MacMillan, Sobanski & Todd, LLC (57) ABSTRACT

A steering shaft assembly for a vehicle includes a slip joint. The slip joint includes a pair of members, each member includes first and second collar and one or more rods extending therebetween. The one or rods of one member are slidably supported by linear bearings mounted in one of the collars of the other member for providing relative axial movement of the members between a fully retracted position and a fully extended position.

19 Claims, 6 Drawing Sheets

AXIALLY ADJUSTABLE STEERING SHAFT ASSEMBLY WITH RODS AND LINEAR BEARINGS

BACKGROUND OF THE INVENTION

This invention relates in general to a rotational driving and shaft assembly. More specifically, this invention relates to a steering shaft assembly with a slip joint having rods and linear bearings for axial movement of the steering shaft assembly.

In virtually every vehicle in use today, a steering system is provided for permitting a driver to control the direction of movement. A typical steering system includes a steering wheel, a steering shaft assembly, and a steering device. The steering wheel is rotatably supported within a driver compartment of the vehicle for movement by a driver. The steering shaft assembly is connected at one end to the steering wheel for rotation therewith. The other end of the steering shaft assembly is connected to the steering device for turning the wheels of the vehicle in response to rotation of the steering wheel. In its simplest form, the steering shaft assembly is embodied as a single shaft or tube having a pair of yokes mounted on the ends thereof. The yokes are usually connected by respective universal joints to the steering wheel and the steering device.

In many larger vehicles, such as trucks, the steering shaft assembly is designed not only to provide a rotational driving connection between the steering wheel and the steering device, but also to permit relative axial movement to occur therebetween. Such relative axial movement is advantageous for two reasons. First, a relatively small amount of such relative axial movement is desirable to accommodate vibrations, bumps, and other aspects of normal vehicle operation that would otherwise be transmitted from the steering device through the steering shaft assembly to the steering wheel. Second, when the vehicle is serviced, a relatively large amount of such relative axial movement is desirable to permit the cab of the vehicle to be pivoted upwardly without requiring disassembly of the steering system.

To accomplish this, it is known to construct the steering shaft assembly from cooperating male and female splined telescoping steering shafts. The first steering shaft is connected to the steering wheel by a first universal joint, while the second steering shaft is connected to the steering device by a second universal joint. The universal joints are provided to permit angular articulation between the steering shafts and the associated steering wheel and the steering device. The splined connection between the first and second steering shafts provides a rotatable driving connection between the steering wheel and the steering device, while permitting relative axial movement therebetween.

In the past, one or both of the splined members were coated with a material having a relatively low coefficient of friction. The low friction coating was provided to minimize the amount of force required to effect relative movement between the two splined members. Also, the low friction coating provided a relatively tight fit between the cooperating splines of the two splined members, thus minimizing any undesirable looseness therebetween while continuing to allow free axial movement.

One problem that has been experienced in connection with slip joints manufactured according to known methods is that an undesirably large gap can still exist between adjacent splines formed on the cooperating members of the slip joint even after the coating has been applied. These relatively large gaps can occur as a result of manufacturing tolerances in the formation of the individual splined members and the coating process and usually result in an undesirable amount of looseness between the splined members during operation. Looseness that occurs in the direction of rotation of the splined members, wherein one of the splined members can rotate relative to the other splined member, is referred to as backlash. Looseness that occurs in the direction transverse to the axis of rotation of the slip joint, wherein one of the splined member can extend at a cantilevered angle relative to the other splined member, is referred to as broken back. Known solutions to the problems of backlash and broken back have been found to be relatively difficult, costly, and time consuming to employ. Thus, it would be desirable to provide an improved slip joint that results in precise conformance between the slip joint members, thus, minimizing the adverse effects of backlash and broken back.

SUMMARY OF THE INVENTION

This invention relates to a slip joint for a steering shaft assembly. The slip joint comprises first and second members. Each member includes first and second collars having one or more rods extending therebetween, wherein one of the rods of the first member extends through one of the first and second collars of the second member and is supported therein for sliding movement by linear bearings, and wherein one of the rods of the second member extends through one of the first and second collars of the first member and is supported therein for sliding movement by linear bearings.

In another aspect of the invention, a steering shaft assembly for a vehicle comprises a slip joint including first and second members. Each member includes first and second collars having one or more rods extending therebetween. The steering shaft assembly further includes a yoke secured to one of the first and second collars of each member by a yoke tube, wherein one of the rods of the first member extends through one of the first and second collars of the second member and is supported therein for sliding movement by linear bearings, and wherein one of the rods of the second member extends through one of the first and second collars of the first member and is supported therein for sliding movement by linear bearings.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
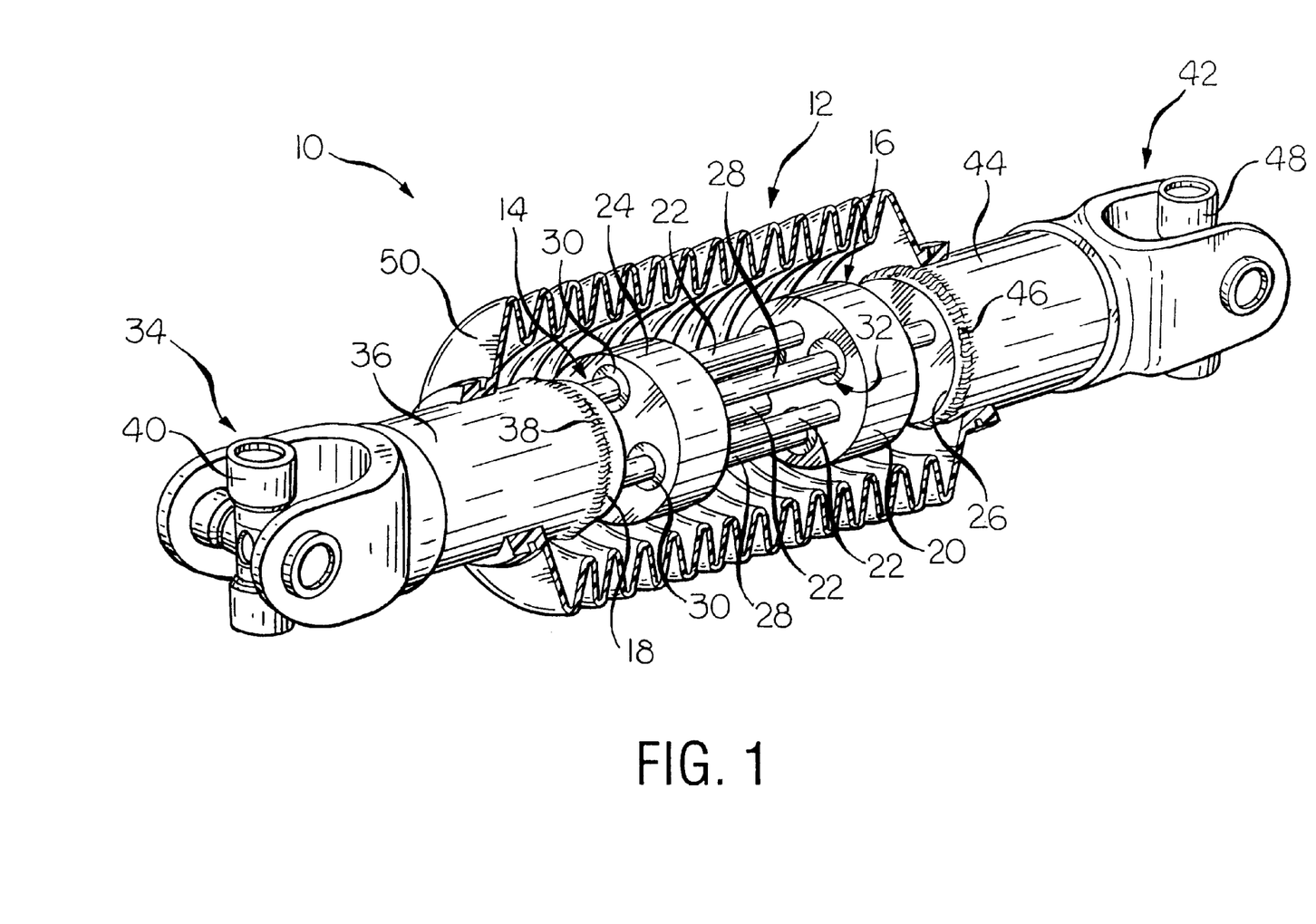
FIG. 1 is a perspective view, partially broken away, of a steering shaft assembly including a slip joint according to the invention.
Figure 2:
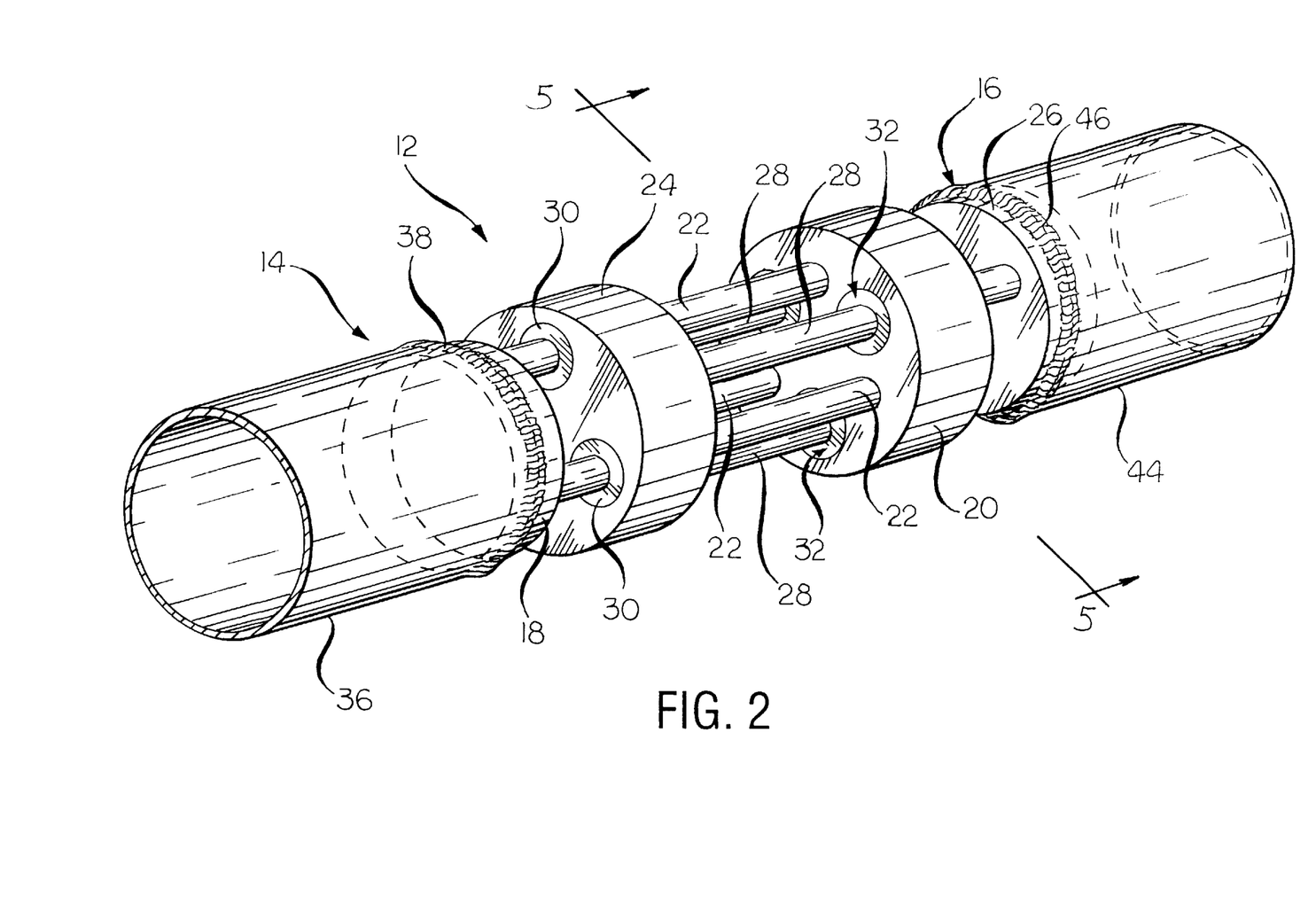
FIG. 2 is an enlarged perspective view of the slip joint illustrated in FIG. 1 showing the rods and linear bearings according to the invention.

Referring now to the drawings, there is illustrated in FIGS. 1 and 2 a steering shaft assembly, indicated generally at 10, in accordance with this invention. Although this invention will be described and illustrated in the context of a vehicular steering shaft assembly 10 as shown, it will be appreciated that this invention can be used in conjunction with any application or any structure that provides a rotational driving connection between a first component and a second component, while permitting relative axial movement therebetween.

The steering shaft assembly 10 includes a slip joint, indicated generally at 12, comprising first and second members, indicated generally at 14 and 16. The first member 14 includes a pair of collars 18 and 20 having one or more rods 22 extending therebetween. The rods 22 are attached to the collars 18 and 20 using any means well-known in the art, such as welding, and the like. Although the illustrated embodiment includes three rods 22 that extend between the collars 18 and 20, it will be appreciated that the invention is not limited by the number of rods 22, and that the invention can be practiced with any desired number of rods 22 extending between the collars 18 and 20.

The second member 16 is substantially identical to the first member 14 and includes a pair of collars 24 and 26 having one or more rods 28 extending therebetween. The rods 28 are attached to the collars 24 and 26 using any means well-known in the art, such as welding, and the like. Although the illustrated embodiment includes three rods 28 that extend between the collars 24 and 26, it will be appreciated that the invention is not limited by the number of rods 28, and that the invention can be practiced with any desired number of rods 28 extending between the collars 24 and 26.

The rods 22 of the first member 14 extend through the collar 24 and are supported by bearings, preferably linear bearings 30, mounted in the collar 24 of the second member 16. As described below, the rods 22 slidably engage the linear bearings 30 of the collar 24 to allow sliding movement of the first member 14 with respect to the second member 16. Likewise, the rods 28 of the second member 16 extend through the collar 20 and are supported by bearings, preferably linear bearings 32 mounted in the collar 20 of the first member 14. The rods 28 slidably engage the linear bearings 32 of the collar 20 to allow sliding movement of the second member 16 with respect to the first member 14. As a result, a rotational driving connection is provided between the first and second members 14 and 16. At the same time, the rods 22 and 28, in conjunction with the linear bearings 30 and 32, allow for relative axial movement to occur between the first and second members 14 and 16. Although the rods 22 and 28 of the illustrated embodiment have a substantially circular cross section, it will be appreciated that this invention can be practiced with rods have any desired cross section that can be supported by any known structure providing a low coefficient of friction for facilitating relative axial movement between the first and second members 14 and 16. The structures of the linear bearings 30 and 32 will be described in greater detail below.

The steering shaft assembly 10 further includes a first yoke, indicated generally at 34, that is secured to the collar 18 of the member 14 by a hollow yoke tube 36. Preferably, the yoke tube 36 has an inner diameter slightly larger than the outer diameter of the collar 18 such that a portion of the collar 18 can be disposed within the yoke tube 36. The yoke tube 36 can be any desired length. The collar 18 and the yoke tube 36 can be welded together, such as shown at 38, to attach the yoke tube 36 to the collar 18. Typically, the yoke 34 is adapted to be connected through a cross 40 to a similar yoke (not shown) so as to form a first universal joint assembly.

Similarly, the steering shaft assembly 10 further includes a second yoke, indicated generally at 42, that is secured to the collar 26 of the member 16 by a hollow yoke tube 44. Preferably, the yoke tube 44 has an inner diameter slightly larger than the outer diameter of the collar 26 such that a portion of the collar 26 can be disposed within the yoke tube 44. The yoke tube 44 can be any desired length. The collar 26 and the yoke tube 44 can be welded together, such as shown at 46, to attach the yoke tube 44 to the collar 26. Typically, the yoke 42 is adapted to be connected through a cross 48 to a similar yoke (not shown) so as to form a second universal joint assembly.

A flexible convoluted boot 50 is provided as an exterior seal structure for the slip joint 12. As shown in FIG. 1, a first end of the flexible boot 50 is secured to the yoke tube 36, such as by a conventional band clamp 52. Similarly, a second end of the flexible boot 50 is secured to the yoke tube 44, such as by a conventional band clamp 54. Alternatively, the flexible boot 50 may be secured to the collars 18 and 26, rather than the yoke tubes 36 and 44, respectively. The boot 50 prevents dirt, water, and other contaminants from entering into the slip joint 12. During use, the yoke tubes 36 and 44 and collars 18 and 26 may move axially relative to each other. When such relative axial movement occurs, the boot 50 will expand and contract axially to accommodate such movement, while continuing to provide the desired sealing action.

Figure 3:
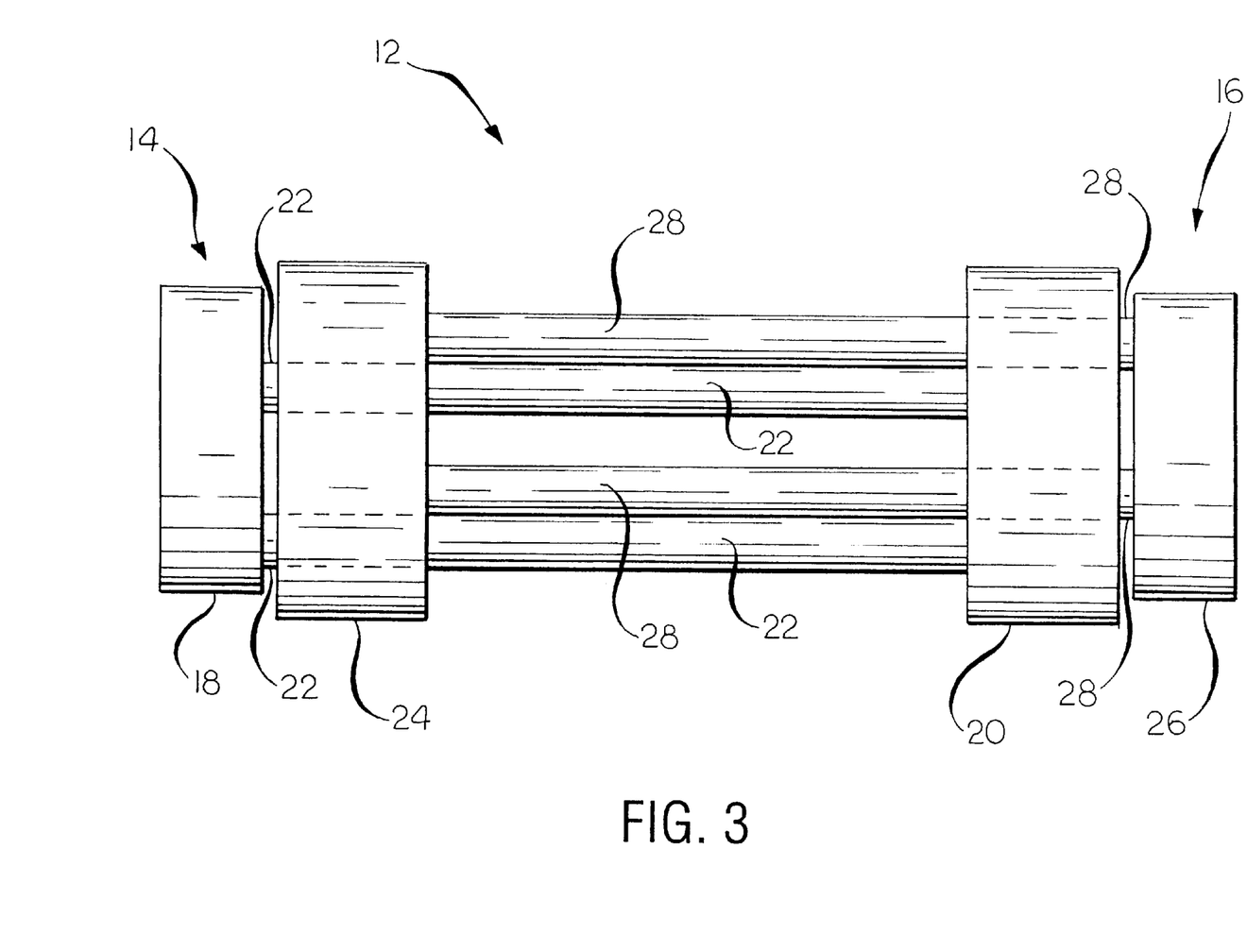
FIG. 3 is a side elevational view of the slip joint with rods and linear bearings when the slip joint is in a fully retracted position.

Referring now to FIG. 3, the slip joint 12 of the vehicle steering shaft assembly 10 is shown in a fully retracted position. In this position, the first and second members 14 and 16 have been moved axially relative to each other such that the collar 18 of the first member 14 is positioned adjacent to the collar 24 of the second member 16. Likewise, the collar 20 of the first member 14 is positioned adjacent to the collar 26 of the second member 16.

Figure 4:
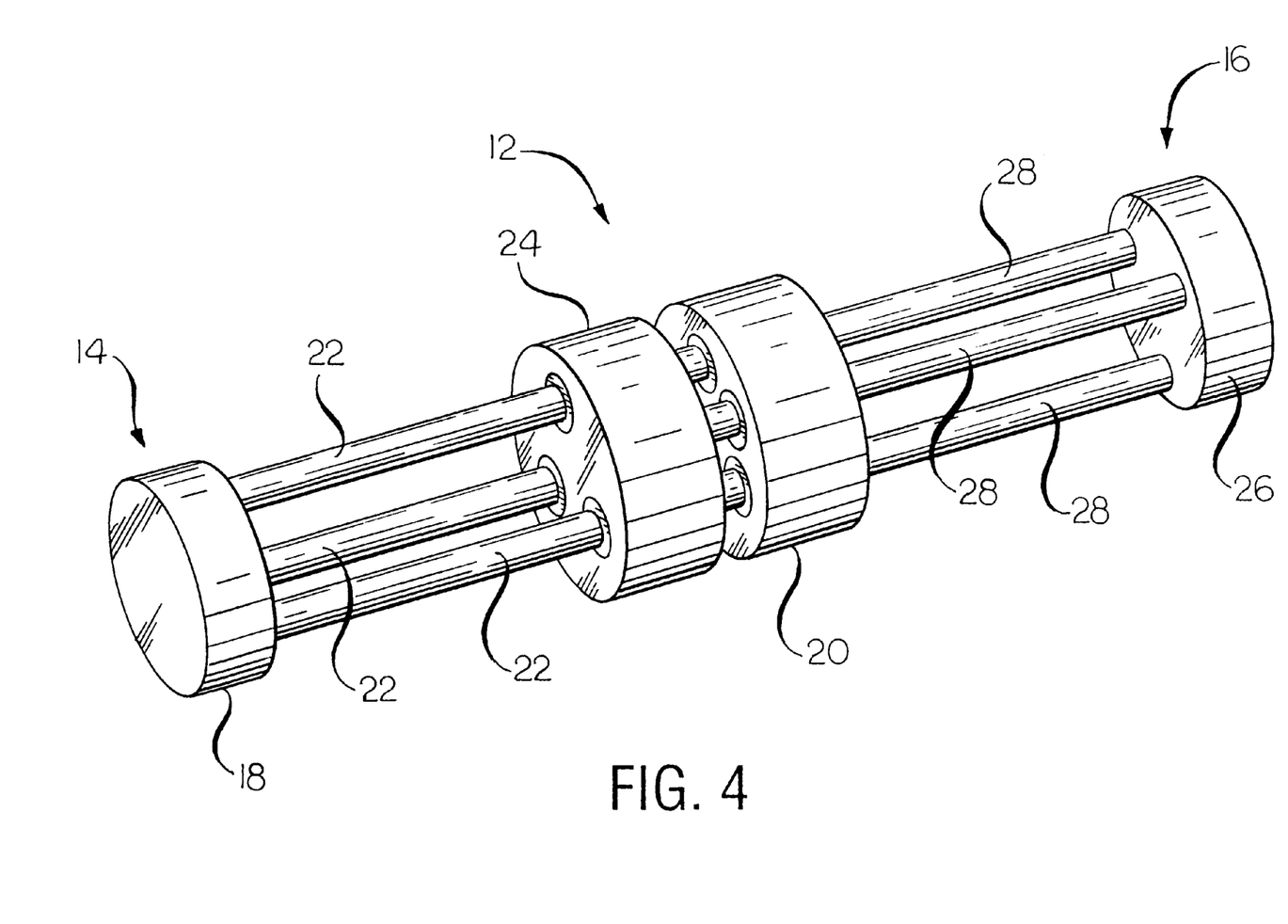
FIG. 4 is a perspective view of the slip joint with rods and linear bearings when the slip joint is in a fully extended position.

Referring now to FIG. 4, the slip joint 12 of the vehicle steering shaft assembly 10 is shown in a fully extended position. In this position, the first and second members 14 and 16 have been moved axially relative to each other such that the collar 20 of the first member 14 is positioned adjacent to the collar 24 of the second member 16. At the same time, the collar 18 of the first member 14 and the collar 26 of the second member 16 are positioned furthest apart from each other. As seen in FIGS. 3 and 4, a relatively large range of relative axial movement can occur between the fully extended position and the fully retracted position.

Figure 5:
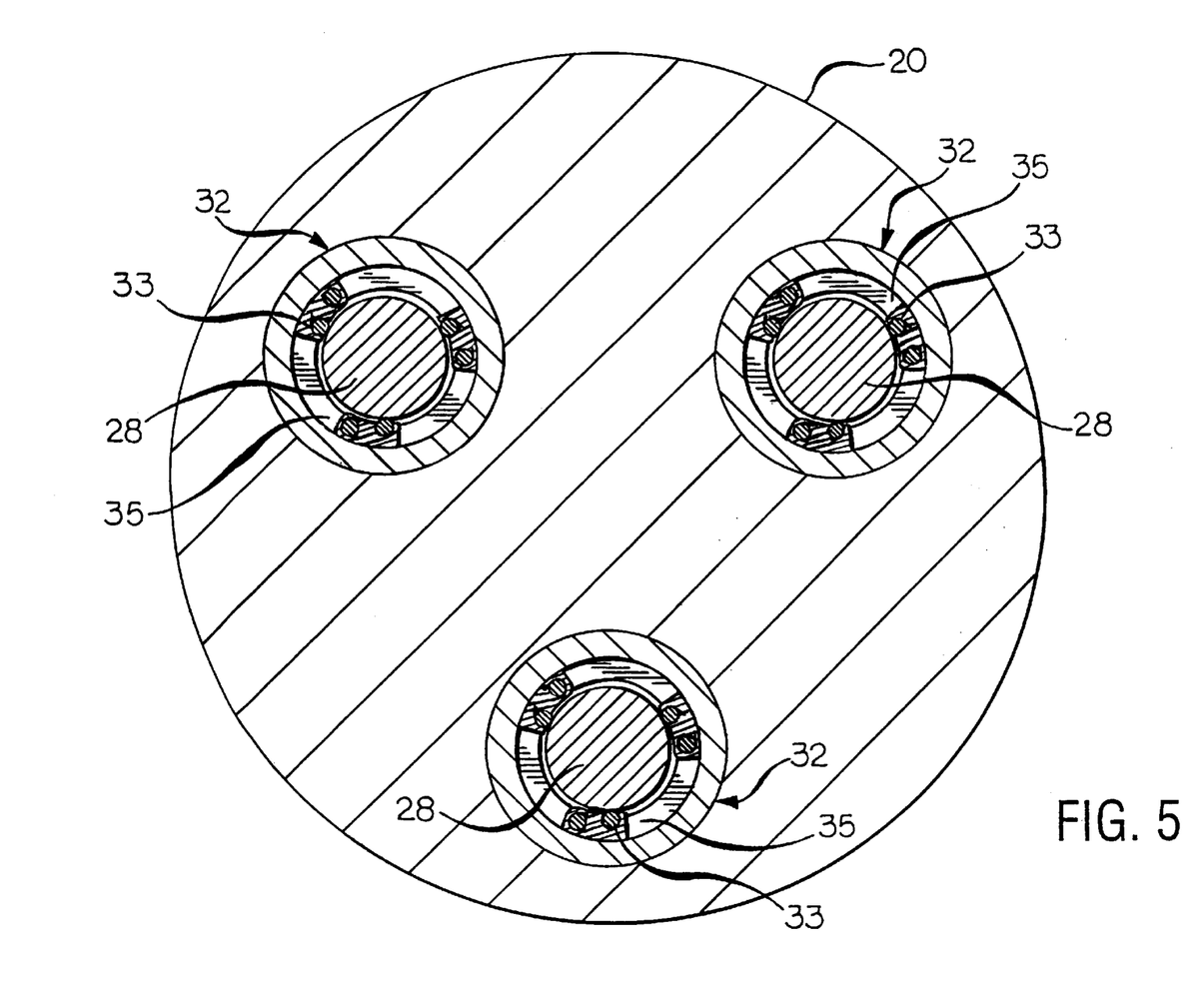
FIG. 5 is a cross sectional view of the collar of the slip joint taken along line 5—5 of FIG. 2.
Figure 6:
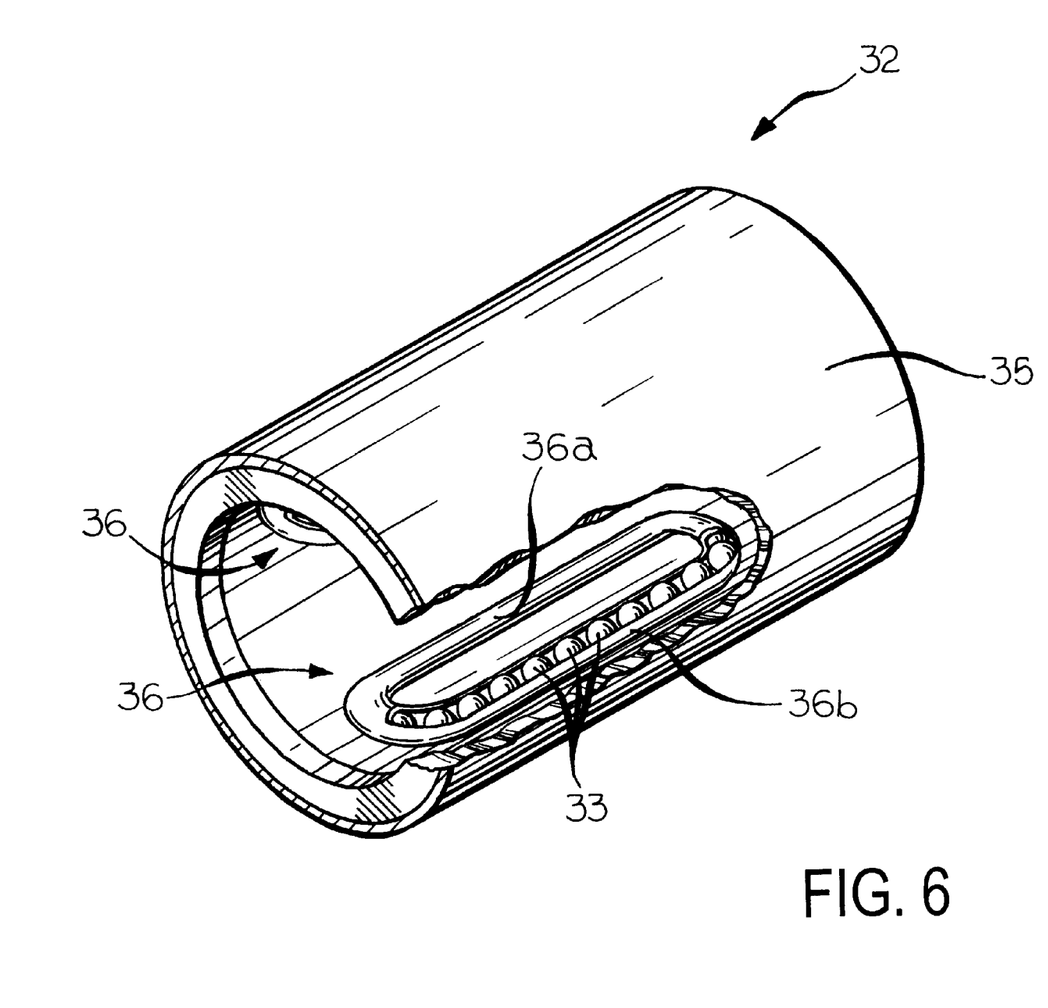
FIG. 6 is an enlarged perspective view, partially broken away, of one of the linear bearings illustrated in FIGS. 1, 2, 4, and 5.

Referring now to FIGS. 5 and 6, it can be seen that each of the linear bearings 32 includes a hollow cylindrical casing 35 defining an outer surface and an inner surface. The outer surfaces of the casings 35 are preferably sized to be press fit within respective openings formed through the collar 20 so as to be retained therein during use. The inner surfaces of the casings 35 have one or more ball races, indicated generally at 36, formed therein. Preferably, each of the inner surfaces of the casings 35 has three generally oval-shaped ball races 36 formed therein, and such ball races 36 are preferably equidistantly spaced apart from one another about the circumference of the inner surface of the inner surface of the casing 35. A plurality of ball bearings 33 is retained within each of the ball races 36 for rolling movement relative thereto. Each of the ball races 36 includes a first enclosed portion 36a that is completely formed within the inner surface of the casing 35 such that the ball bearings 33 are not exposed to the interior of the linear bearing 32. Each of the ball bearings 36 further includes a second exposed portion 36b that is only partially formed within the inner surface of the casing 35 such that the ball bearings 33 are exposed to the interior of the linear bearing 32.

As best shown in FIG. 5, the first enclosed portions 36a of the ball races 36 define an inner diameter that is slightly larger than an inner diameter defined by the second exposed portions 36b of the ball races 36. As a result, the innermost diameter of the linear bearings 32 is defined by the exposed portions of the ball bearings 33 disposed in the second exposed portions 36b of the ball races 36. Thus, the ball bearings 33 engage the rods 28 as shown in FIG. 5 to facilitate sliding movement of the second member 16 with respect to the first member 14. During such sliding movement, the ball bearings 33 circulate throughout the respective ball races 36 so that the amount of frictional resistance to the sliding movement of the rods 28 is very small. Furthermore, the engagement of the rods 28 by the ball bearings 33 is precisely controlled to virtually eliminate the amount of backlash and broken back between rods 28 and the collar 20. The linear bearings 30 of the collar 24 are substantially identical in structure and operation to the linear bearings 32 and the collar 20 described above. The linear bearings 30 and 32 are conventional in the art and are commercially available from a variety of sources in the market. The linear bearings 30 and 32 may be embodied as any desired linear bearing structure.

As described above, the steering shaft assembly 10 includes a slip joint 12 with rods 22, 28 and linear bearings 30, 32. Because of the precise conformance between the rods 22, 28 and the linear bearings 30, 32, the slip joint 12 does not suffer from backlash and broken back that occurs from the looseness associated with conventional telescoping members.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A slip joint comprising:
    first and second members, each member including first and second collars having one or more rods extending therebetween,
    wherein one of the rods of the first member extend through one of the first and second collars of the second member and are supported therein for sliding movement by linear bearings, and
    wherein one of the rods of the second member extend through one of the first and second collars of the first member and are supported therein for sliding movement by linear bearings.

2. The slip joint according to claim 1 wherein the first collar of the first member is positioned adjacent the second collar of the second member, and wherein the second collar of the first member is positioned adjacent the first collar of the second member when the slip joint is in a fully closed position.

3. The slip joint according to claim 1 wherein the second collar of the first member is positioned adjacent the second collar of the second member, and wherein the first collar of the first member and the first collar of the second member are positioned furthest apart from each other when the slip joint is in a fully extended position.

4. A slip joint for a steering shaft assembly comprising:
    first and second members, each member including first and second collars having a plurality of rods extending therebetween,
    wherein one of the plurality rods of the first member extend through one of the first and second collars of the second member and are supported therein for sliding movement by linear bearings, and
    wherein one of the plurality of rods of the second member extend through one of the first and second collars of the first member and are supported therein for sliding movement by linear bearings.

5. The slip joint according to claim 4 wherein the plurality of rods comprises three rods.

6. The slip joint according to claim 4 wherein the first collar of the first member is positioned adjacent the second collar of the second member, and wherein the second collar of the first member is positioned adjacent the first collar of the second member when the slip joint is in a fully closed position.

7. The slip joint according to claim 4 wherein the second collar of the first member is positioned adjacent the second collar of the second member, and wherein the first collar of the first member and the first collar of the second member are positioned furthest apart from each other when the slip joint is in a fully extended position.

8. A steering shaft assembly for a vehicle comprising:
    a slip joint including first and second members, each member including first and second collars having one or more rods extending therebetween; and
    a yoke secured to one of the first and second collars of each member by a yoke tube,
    wherein one of the rods of the first member extend through one of the first and second collars of the second member and are supported therein for sliding movement by linear bearings, and
    wherein one of the rods of the second member extend through one of the first and second collars of the first member and are supported therein for sliding movement by linear bearings.

9. The steering shaft assembly according to claim 8 wherein the first collar of the first member is positioned adjacent the second collar of the second member, and wherein the second collar of the first member is positioned adjacent the first collar of the second member when the slip joint is in a fully closed position.

10. The steering shaft assembly according to claim 8 wherein the second collar of the first member is positioned adjacent the second collar of the second member, and wherein the first collar of the first member and the first collar of the second member are positioned furthest apart from each other when the slip joint is in a fully extended position.

11. The steering shaft assembly according to claim 8 wherein the yoke tube has an inner diameter slightly larger than the outer diameter of one of the first and second collars such that a portion of the collar can be disposed within the yoke tube.

12. The steering shaft assembly according to claim 8 further including a flexible convoluted boot for sealing the slip joint.

13. A slip joint comprising:
    a first member including a first member first collar, a first member second collar having a first opening formed therethrough, and a first rod connected between said first member first collar and said first member second collar;

a second member including a second member first collar, a second member second collar having a second opening formed therethrough, and a second rod connected between said second member first collar and said second member second collar;

said first rod extending through said second opening so as to be supported for sliding movement relative to said second member, said second rod extending through said first opening so as to be supported for sliding movement relative to said first member.

14. The slip joint defined in claim 13 wherein said first member second collar has a plurality of first openings formed therethrough, said second member has a plurality of second rods connected between said second member first collar and said second member second collar, and said second rods extend respectively through said first openings so as to be supported for sliding movement relative to said first member.

15. The slip joint defined in claim 13 wherein said second member second collar has a plurality of second openings formed therethrough, said first member has a plurality of first rods connected between said first member first collar and said first member second collar, and said first rods extend respectively through said second openings so as to be supported for sliding movement relative to said second member.

16. The slip joint defined in claim 13 wherein said first member second collar has a plurality of first openings formed therethrough, and a plurality of first rods is connected between said first member first collar and said first member second collar, said second member second collar has a plurality of second openings formed therethrough, and a plurality of second rods is connected between said second member first collar and said second member second collar, said first rods extend respectively through said second openings so as to be supported for sliding movement relative to said second member, and said second rods extend respectively through said first openings so as to be supported for sliding movement relative to said first member.

17. The slip joint defined in claim 13 wherein a linear bearing is disposed within said first opening, and said second rod is supported by said linear bearing so as to be supported for sliding movement relative to said second member.

18. The slip joint defined in claim 13 wherein a linear bearing is disposed within said second opening, and said first rod is supported by said linear bearing so as to be supported for sliding movement relative to said first member.

19. The slip joint defined in claim 13 wherein a first linear bearing is disposed within said first opening, and said second rod is supported by said first linear bearing so as to be supported for sliding movement relative to said second member, and wherein a second linear bearing is disposed within said second opening, and said first rod is supported by said second linear bearing so as to be supported for sliding movement relative to said first member.

* * * * *